(No Model.) 4 Sheets—Sheet 1.

J. ZIMMERMANN.
POTATO HARVESTING MACHINE.

No. 428,794. Patented May 27, 1890.

Witnesses:
Inventor:
Jacob Zimmermann (No Model.) 4 Sheets—Sheet 2.
J. ZIMMERMANN.
POTATO HARVESTING MACHINE.
No. 428,794. Patented May 27, 1890.
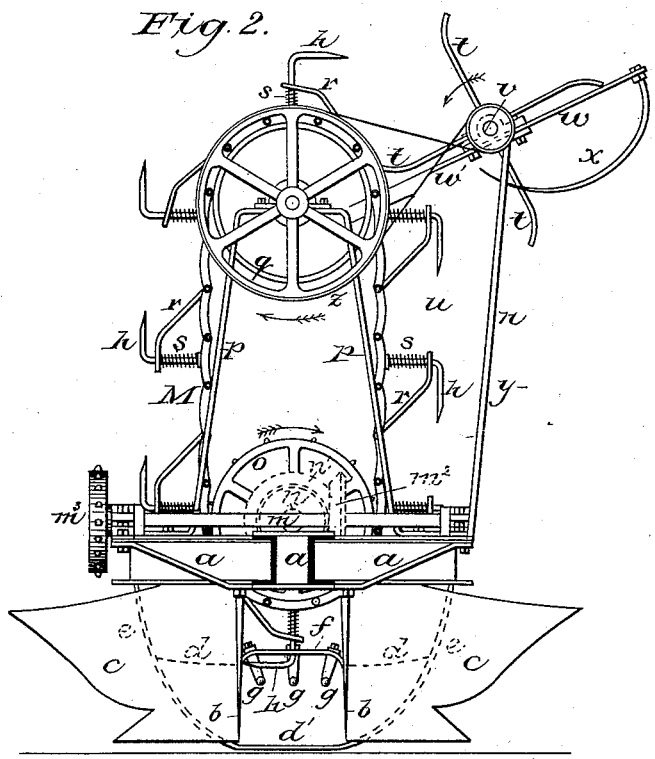
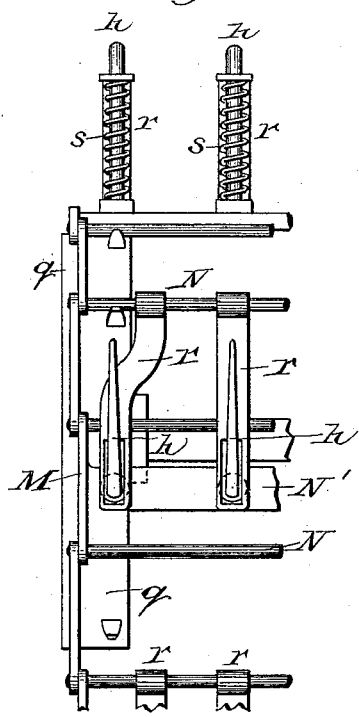
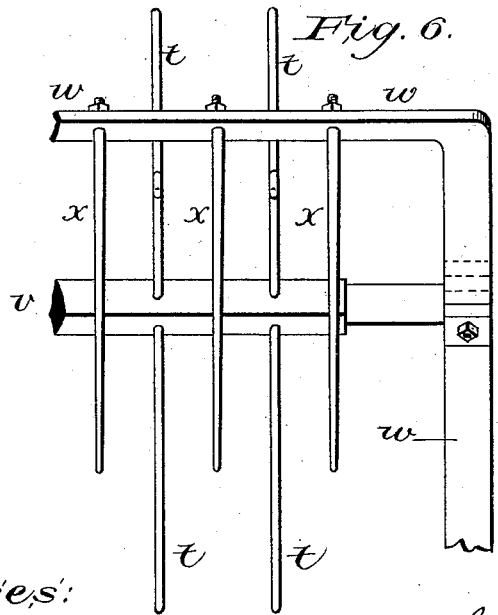
Witnesses:
Inventor:
Jakob Zimmermann
by Goepel & Raegener
Attorneys (No Model.) 4 Sheets—Sheet 3.
J. ZIMMERMANN.
POTATO HARVESTING MACHINE.

No. 428,794. Patented May 27, 1890.

Witnesses: Inventor:
Jacob Zimmermann
by
Attorneys

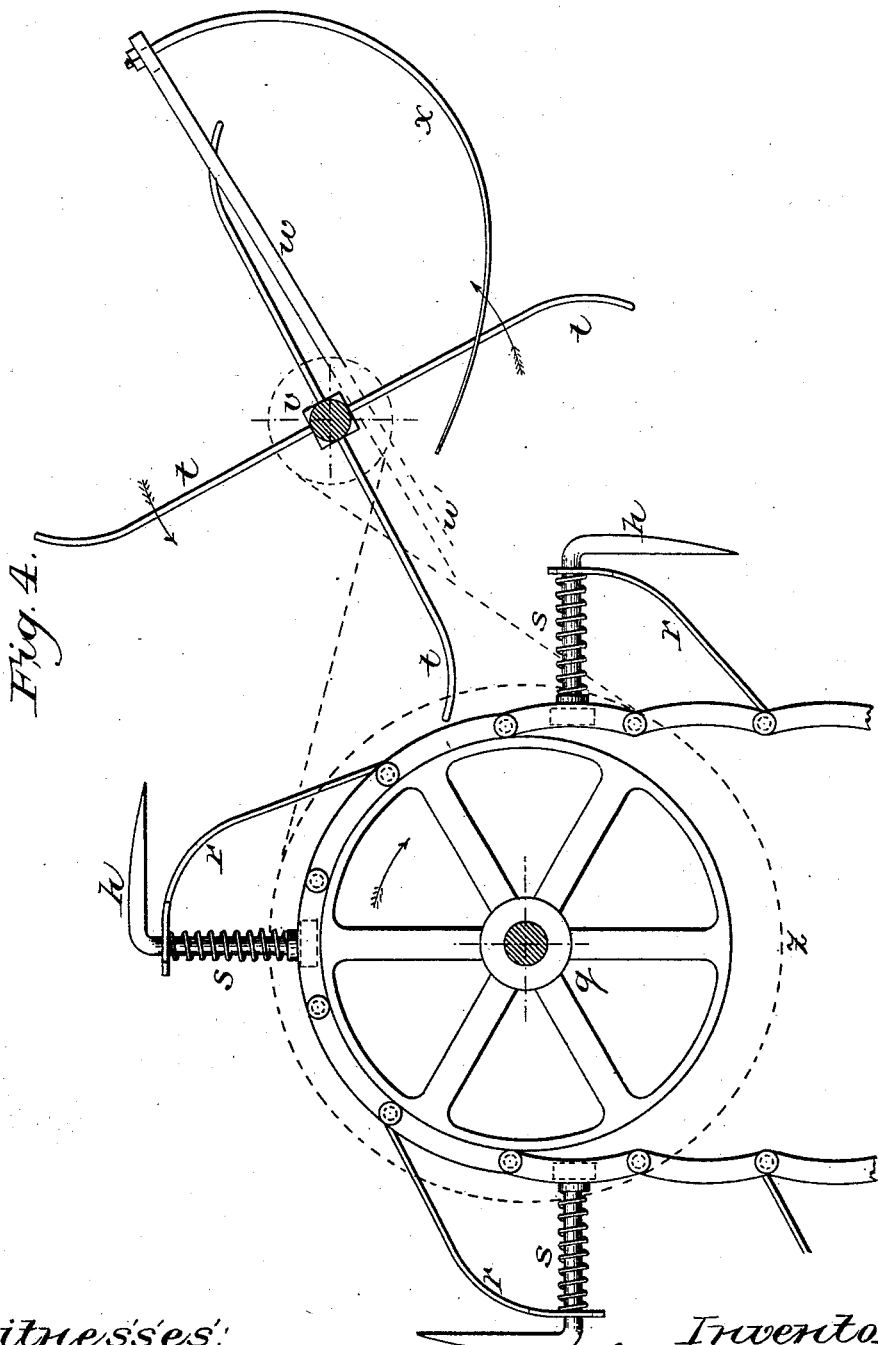

UNITED STATES PATENT OFFICE.

JAKOB ZIMMERMANN, OF AUGSBURG, BAVARIA, GERMANY.

POTATO-HARVESTING MACHINE.

SPECIFICATION forming part of Letters Patent No. 428,794, dated May 27, 1890.

Application filed October 9, 1889. Serial No. 326,535. (No model.) Patented in Germany August 14, 1888, No. 46,797.

*To all whom it may concern:*

Be it known that I, JAKOB ZIMMERMANN, residing at Augsburg, in the Kingdom of Bavaria, German Empire, a subject of the Emperor of Germany, have invented certain new and useful Improvements in Potato-Harvesting Machines, (for which I have obtained a patent in Germany, No 46,797, dated August 14, 1888,) of which the following is a specification.

This invention relates to improvements in that class of machines that are used for digging potatoes and separating them from the soil from which they have been removed.

The object of my invention is to provide a machine of this kind which automatically separates the leaves and stalks from the potatoes and carries off said leaves and stalks, the potatoes being carried off and assorted and sifted by a mechanism of any well-known construction, which is to be connected with my improved harvester.

The invention consists in the construction and combination of parts and details, as will be fully described hereinafter, and finally pointed out in the claims.

Figure 1:
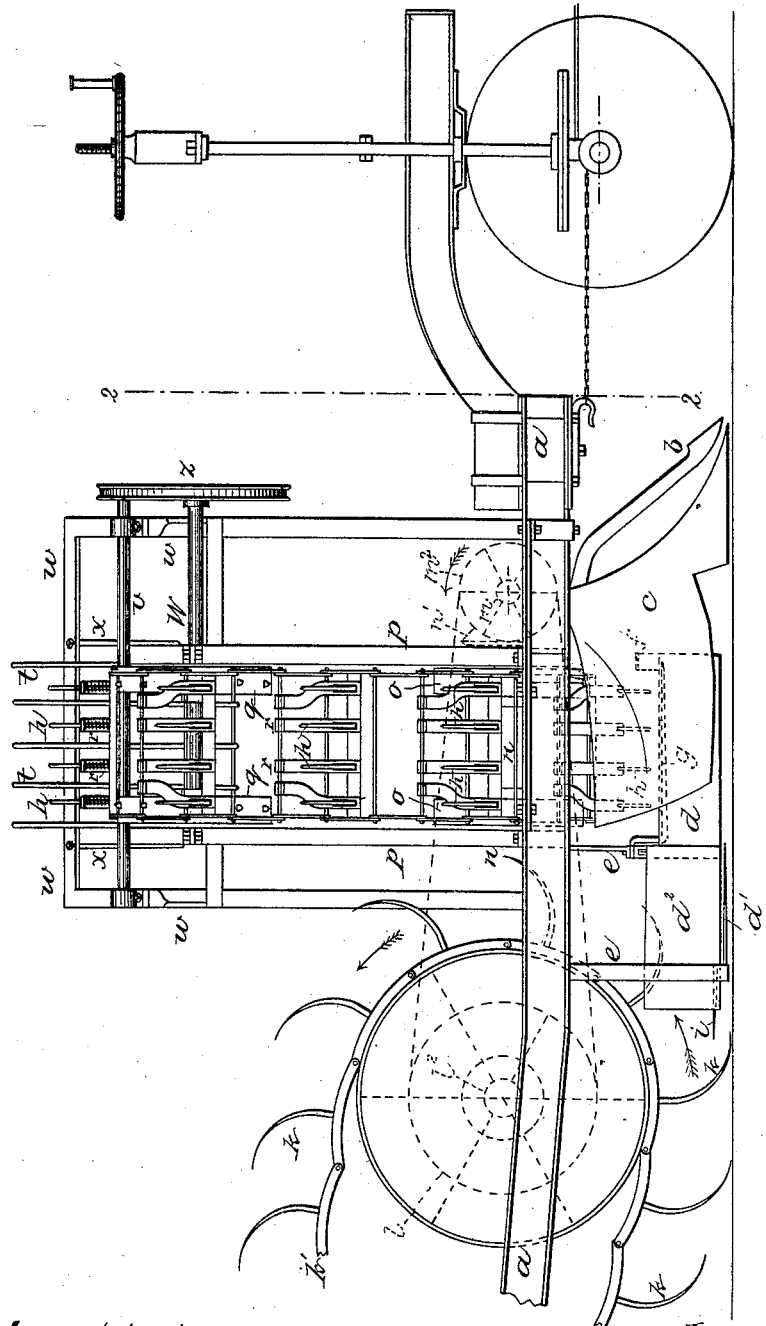
Figure 3:
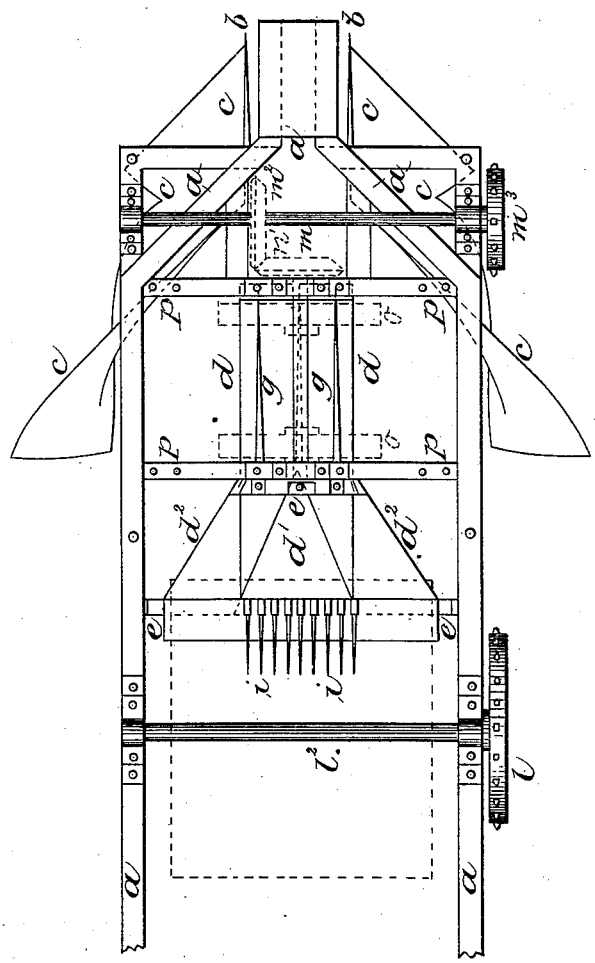

In the accompanying drawings, Figure 1 is a side view of my improved machine for harvesting potatoes. Fig. 2 is a vertical transverse sectional view of the same on the line 2 2, Fig. 1. Fig. 3 is a plan view of the same. Fig. 4 is an enlarged detail sectional view of the discharge mechanism for the leaf and stalk carrier. Fig. 5 is a detail elevation of parts of the leaf and stalk carrier, and Fig. 6 is a detail view in elevation of the rotary clearing device and the fixed tines between the same.

Similar letters of reference indicate corresponding parts.

The frame $a$ of the machine is suitably mounted on wheels in any well-known manner, and from the front part of said frame two blades $b$ project downward and are separated from each other about equal to the width of an ordinary potato-mound—that is to say, they are separated from each other about the distance of the top of the mound—so that when the machine is drawn over the ground these knives will cut into the inclined sides of the mound. Behind each blade $b$ an outwardly-inclined plow $c$ is arranged, which carries off those parts of the sides of the mound that have been cut off by the blades $b$, thus leaving the mound with vertical sides. Directly behind and between the plows $c$ the vertical boards $d$ are arranged, which embrace the vertical sides formed on the mounds by the knives D. Behind the boards $d$ the outwardly-inclined vertical boards $d^2$ are arranged, which are supported by suitable hangers or cross-bars $e$, secured to the bottom of the frame $a$. From the bottom cross-piece of the rear brace $e$ the horizontal and tapering blade D is fixed, which is located so deep that it can cut into the bottom of the mound— that is, below the potatoes—and loosen the earth containing the potatoes.

From a cross-piece at the rear edges of the blades $d'$ a series of tines $i$ project horizontally toward the rear, which support the potatoes until they are seized by the curved tines $k$ on the endless chain $k'$, which conveys them to the cleaning and assorting device, of any well-known construction, said tines permitting the earth still adhering to the potatoes to drop from the same. From the front of the cross-bar or hanger $e$ a series of tines $g$ project horizontally toward the front, said tines being so located that they will pass directly over or through the tops of the mounds. The front edges of the side boards $d$ are connected by a cross-piece $f$, which brushes and holds down the stalks and leaves of the potato-plants.

A triangular or pointed horizontal blade or plow $d'$ projects from the front of the hanger or cross-piece $e$.

On a vertical frame $p$ of the main frame $a$ the shaft W is mounted, on which are fixed the sprocket-wheels $q$, which correspond with sprocket-wheels $o$, mounted on a horizontal shaft $n$, journaled lengthwise of the machine on the main frame $a$. Said shaft $n$ carries a beveled cog-wheel $n'$, which engages a beveled cog-wheel $m^2$, fixed on a transverse shaft $m$, journaled on the frame $a$, which shaft $m$ is rotated by suitable mechanism, that will be described hereinafter. Around the wheels $o$ and $q$ two endless chains M are passed, which are connected by transverse rods N at the points of the links forming the chain. Some of the links of the chains M are also connected by cross-rods N', from which a series of hook-shaped tines $h$ project, the shanks of which are surrounded by spiral springs $s$, that bear against holding-arms $r$, that are pivoted or mounted to swing on adjacent rods N, and are provided on their free ends with eyes, through which the shanks of the tines $h$ can pass, said springs $s$ pressing the swinging ends of said clearing-arms toward the prongs of the tines $h$. A shaft $v$ is mounted on the arms $w$ of the upwardly-projecting frame $p$, and said shaft $v$ is provided with a series of tines $t$, which can pass in between the tines $h$ of the endless chains M. The shaft $v$ is provided on its free end with a pulley $v'$, over which an endless belt $w'$ passes, which also passes over a pulley $z$, mounted on the shaft $w$, so that the shaft $v$ is rotated in the reverse direction of the shaft W. From the ends of the arms $w$ a series of curved tines $x$ project toward the drum $q$ and pass in between the tines $t$ of the shaft $v$. On one end of the shaft $m$ a sprocket-wheel $m^3$ is mounted, over which a driving-chain passes from the sprocket-wheel $l$ on the rear shaft $l^2$ of the frame.

The operation is as follows: When the machine is drawn over the potato-field parallel with the mounds, the blades $b$ cut into the ground at the sides of the mound and the plows $c$ carry the earth cut off by said blades. The mound is now confined between the upright blades $d$, and the bar $f$ in passing over the mounds bends down the potato stalks and leaves. The tines $h$ on the endless chains M seize the potato stalks and leaves and tear them from the plants, which are held in the mound by the prongs $g$, and thus said prongs prevent the bulbs being pulled out with the stalks. The blade $d'$ then digs under the mound, thereby loosening the potatoes, which are then seized by the curved tines $k$ on the endless chains $k'$ and conveyed to a cleaning and assorting machine. The tines $h$ carry the stalks and leaves upward, which stalks are pressed against the prongs of the tines by the holding-arms $r$ and springs $s$. When the tines arrive at the top, as shown in Fig. 2, the weights of the arms $r$ cause the same to descend, thereby compressing the springs $s$ slightly, whereby the stalks and leaves are released and can drop into a suitable receptacle, which is placed at $u$ in Fig. 2. The tines $t$ of the shaft $v$, passing in between the tines $h$ on the endless chains, clear said tines $h$, thus removing all the stalks and leaves adhering to the same, and the said tines $t$ are in turn cleared by the fixed tines $x$ on the arms $w$.

Having thus described my invention, I claim as new and desire to secure by Letters Patent—

1. In a potato-harvesting machine, the combination, with a suitable frame, of downwardly-projecting side blades for cutting off the sides of the mounds, plows behind said knives, vertical boards behind the plows and adapted to slide on the vertical sides of the mound, and a cross-bar uniting said vertical boards at the front and serving to bend down the potato-stalks, substantially as set forth.

2. In a potato-harvesting machine, the combination, with a suitable frame, of blades projecting down from the same for the purpose of cutting off the sides of the potato-mounds, vertical boards behind said knives, a cross-bar uniting the tops of said boards at the front for the purpose of bending down the stalks, and a series of prongs projecting toward the front of the machine between said boards, substantially as set forth.

3. The combination, with a frame, of downwardly-projecting side blades, vertical boards behind the blades, outwardly-inclined boards behind the vertical boards, a blade below said outwardly-inclined boards, prongs projecting from the rear edge of said blade, an endless carrier for removing the potatoes, and prongs extending toward the front of the machine and located between the top edges of the above-mentioned vertical boards, substantially as set forth.

4. In a potato-harvesting machine, the combination, with a frame, of horizontal prongs so mounted as to pass over the tops of the potato-mounds, and endless chains mounted on the frame above said prongs and provided with tines, substantially as set forth.

5. In a potato-harvesting machine, the combination, with a frame, of horizontal prongs projecting toward the front, a vertical frame above said horizontal prongs, endless chains passing over drums on said frame, tines on the cross-bars of said chain, and a rotating shaft provided with clearing-tines, which pass between the tines on the endless chains, substantially as set forth.

6. In a potato-harvesting machine, the combination, with a frame, of horizontal prongs projecting toward the front, a vertical frame above said horizontal prongs, endless chains passing over drums on said frame, tines on the cross-bars of said chain, and a rotating shaft provided with clearing-tines, which pass between the tines on the endless chains, and of fixed tines, between which the tines on the rotating shaft can pass, substantially as set forth.

7. In a potato-harvesting machine, the combination, with a frame, of a series of horizontal prongs projecting toward the front, a vertical frame above said prongs, drums on said frame, endless chains passing over the drums, hook-tines on said chains, pivoted levers having eyes through which the shanks of the hook-tines pass, and springs for pressing the swinging ends of said levers toward the prongs of the hook-tines, substantially as set forth.

8. In a potato-harvesting machine, the combination, with a frame, of mound-cutting blades on the same, clearing-plows behind the blades, vertical boards behind the blades, horizontal prongs above the vertical boards, endless chains carrying prongs located above said horizontal prongs, driving mechanism for operating said endless chains, a potato-conveyer arranged behind the vertical longitudinal boards, and power-transmitting mechanism for operating the endless chain from the shaft of the conveyer-chain, substantially as set forth.

In testimony that I claim the foregoing as my invention I have signed my name in presence of two subscribing witnesses.

JAKOB ZIMMERMANN.

Witnesses:
EMIL HENZEL,
EUGEN GUGEL.